Patented Nov. 30, 1943

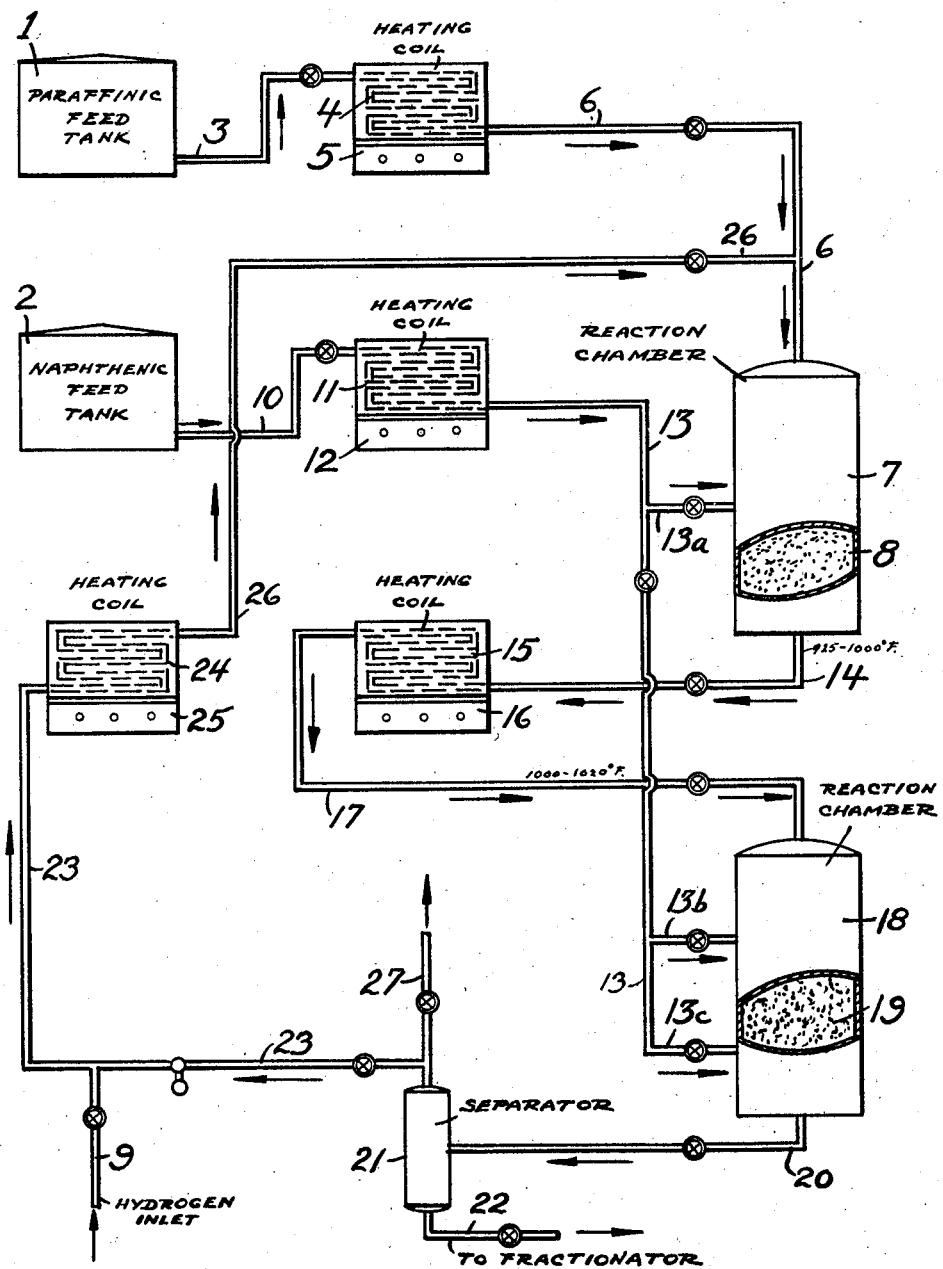

2,335,684

UNITED STATES PATENT OFFICE 2,335,684

CATALYTIC REFORMING

Maurice W. Mayer, Baytown, Tex., assignor, by mesne assignments, to Standard Catalytic Company, a corporation of Delaware Application December 2, 1941, Serial No. 421,271

11 Claims. (Cl. 196—52)

This invention relates to the catalytic reforming of hydrocarbon oils and is more particularly concerned with certain improvements in the method of operation by means of which the efficiency and economy of the process may be increased.

The term "catalytic reforming" wherever used in the specification and claims shall be understood to mean any process of subjecting hydrocarbon oils consisting essentially of hydrocarbons boiling in the gasoline range to heat treatment at a temperature in excess of 500° F. and in the presence of catalysts to produce a dehydrogenated or otherwise chemically reconstructed product, for example of anti-knock characteristics superior to those of the starting material, with or without an accompanying change in molecular weight. By the term "chemically reconstructed" is meant something more than the mere removal of impurities or ordinary finishing treatments. The term catalytic reforming shall be understood to include, but not by way of limitation, reactions such as dehydrogenation, aromatization or cyclization, desulfurization, alkylation and isomerization, all or some of which may occur to a greater or lesser extent during the process.

The term "catalytic reforming in the presence of hydrogen," wherever used in the specification and claims, shall be understood to mean a process of catalytic reforming carried out in the presence of added or recirculated hydrogen or gases containing hydrogen under such conditions that there is either no overall net consumption of free hydrogen or there is an overall net production of free hydrogen.

Processes of catalytic reforming and catalytic reforming in the presence of hydrogen are endothermic and consequently heat must be supplied to the reaction zone to maintain the temperatures required for the reaction. The catalysts ordinarily used in catalytic reforming and catalytic reforming in the presence of hydrogen gradually lose their activity in promoting the desired reactions because of the formation or deposition thereon during use of carbonaceous contaminants such as coke. These contaminants must be periodically removed in order to regenerate the activity of the catalysts. The length of time the catalyst can be used before it requires regeneration is much shorter in the case of catalytic reforming than in catalytic reforming in the presence of hydrogen and in fact this is one of the principal reasons for conducting the catalytic reforming treatment in the presence of hydrogen.

In commercial plants now operating on catalytic reforming in the presence of hydrogen, it is customary to provide two separate reaction chambers identical in size and to pass the oil to be treated first through one reaction chamber, next through a reheating means and then through the second reaction chamber. In this way sufficient heat is supplied between the two reaction chambers to make up for the heat consumed in the first chamber.

I have observed that in the catalytic reforming or the catalytic reforming in the presence of hydrogen of feed stocks containing a mixture of naphthenic and paraffinic hydrocarbons, the dehydrogenation of the naphthenes occurs very rapidly with the consumption of substantial quantities of heat and with very little formation of coke. On the other hand, the dehydrogenation and aromatization of the paraffinic hydrocarbons occur more slowly, with relatively much larger formation of coke and with relatively less consumption of heat. As a result of these factors there is a relatively small amount of coke deposited on the catalyst near the inlet end of the reaction chamber and a relatively large amount of coke deposited on the catalyst near the exit end. In addition, the large amount of heat consumed in that portion of the reaction chamber nearest the inlet thereto by the dehydrogenation of the naphthenes frequently lowers the temperature to such an extent that satisfactory reaction of the paraffins does not occur. It is of course desirable to maintain as nearly uniform temperature in the entire reaction chamber as possible. It is also highly desirable to have the coke uniformly distributed throughout the catalyst mass because better control of catalyst regeneration and more efficient utilization of the catalyst are then possible.

The present invention has for its principal objects the provision of means whereby these two desirable objectives may be more nearly realized than is possible in the methods of operation heretofore employed.

The nature of the improved method of operation and the manner in which it is carried out will be fully understood from the following description when read with reference to the accompanying drawing which is a semi-diagrammatic view in sectional elevation of one type of apparatus suitable for the purpose.

Referring to the drawing, numeral 1 designates a supply of a paraffinic or predominantly paraffinic hydrocarbon oil and numeral 2 designates a supply of naphthenic or predominantly naphthenic hydrocarbon oil. These paraffinic and naphthenic feed stocks may have been obtained directly from paraffinic and naphthenic crudes respectively or they may have been obtained by segregating a mixture of paraffinic and naphthenic hydrocarbon oils into its respectively more paraffinic and naphthenic components, as, for example, by solvent extraction. Both hydrocarbon oils consist essentially of hydrocarbons boiling in the gasoline range, say between 90 and 400 or 500° F.

The paraffinc feed flows from tank 1 through line 3 into and through a heating coil 4 mounted in a suitable furnace 5 and then flows through line 6 into the top of a reaction chamber 7 containing a catalyst 8, the nature of which will be more fully described below. For purposes of description it will be assumed that the process is to be catalytic reforming in the presence of hydrogen. In this event, hydrogen or a gas rich in free hydrogen will, after being heated to substantially the same temperature as the paraffinic feed, be introduced into the top of reaction chamber 7 together with the paraffinic feed. Such hydrogen may be supplied through a line 9 or the gases produced in the process may be recycled as will be described below.

Naphthenic feed flows from tank 2 through line 10 into and through a heating coil 11 mounted in a furnace 12 and then flows through lines 13 and 13a into an intermediate portion of the reaction chamber 7 substantially below the point at which the paraffinic feed is introduced. It will be understood that the paraffinic feed may be introduced into the bottom portion of reaction chamber 7 in which event the naphthenic feed will be introduced at a point substantially removed from the point of introduction of the paraffinic feed.

Reaction chamber 7 is maintained at a temperature between 850 and 1100° F. and under a pressure between slightly above atmospheric and 800 pounds per square inch, preferably between 50 and 500 pounds per square inch. The quantity of gas containing hydrogen which accompanies the oil through the reaction chamber is between 1000 and 5000 cubic feet per barrel of oil and this gas preferably contains between 30 and 90 mol percent of free hydrogen. The rate at which the oil passes through the reaction chamber is between 0.1 and 3.0 volumes of liquid oil per volume of catalyst per hour.

In the upper portion of reaction chamber 7 the paraffinic feed undergoes reaction while the temperature is at its highest level. In the portion of the reaction chamber below the point at which the naphthenic feed is introduced the temperature has been somewhat lowered because of the endothermic nature of the reactions but nevertheless it is still sufficiently high to cause dehydrogenation of the readily dehydrogenated naphthenic hydrocarbons.

Products of reaction leave reaction chamber 7 through line 14, pass through a reheating coil 15 in a furnace 16 and then flow through line 17 into the top of a second reaction chamber 18 substantially similar to the first reaction chamber 7 and containing a suitable catalyst 19 the composition of which may be the same as or different from that of catalyst 8. Naphthenic hydrocarbons are introduced into reaction chamber 18 through lines 13, 13b and 13c at intermediate points below the point of introduction of the reheated products from reaction chamber 7. It will be understood that naphthenic hydrocarbons may be introduced into reaction chamber 18 at a plurality of different points Reaction chamber 18 is maintained under substantially the same conditions as reaction chamber 7 and here again it will be noted that the naphthenic feed is not introduced until after the more refractory paraffinic hydrocarbons which may have been unaffected in reaction chamber 7 are given an opportunity to react at the highest temperature prevailing in reaction chamber 18.

Products of reaction leave reaction chamber 18 through line 20 and are introduced, after being cooled to cause condensation of the normally liquid products, into a separating means 21 wherein the gaseous and liquid products are separated. The liquid products are removed from separating means 21 through line 22 and passes to a fractionating means (not shown) for working up into the desired product.

The gaseous products, which will contain substantial amounts of hydrogen and smaller amounts of low molecular weight hydrocarbons such as methane, ethane and propane are removed from separating means 21 through line 23, passed through a heating coil 24 in a furnace 25 and then passed through line 26 which meets line 6 carrying treated paraffinic feed into the top of reaction chamber 7. Because of the fact that the catalytic reforming treatment is carried out in the presence of hydrogen under conditions such that there is either no overall net consumption of free hydrogen or there is an overall net production of free hydrogen, the gaseous products of reaction will provide sufficient hydrogen for the process and may be continuously recycled. If more gas is produced than is required, a portion of it may be removed from the system through vent line 27.

The catalysts 8 and 19 in reaction chambers 7 and 18 respectively should promote reforming and should be capable of regeneration. They may be selected from a wide variety of different materials. Especially satisfactory catalysts of this type comprise major proportions of aluminum oxide and minor proportions of oxides or sulfides of metals of the IV, V, VI and VIII groups of the periodic system. The oxides or sulfides of vanadium, molybdenum, chromium, tungsten and nickel are particularly effective. Various forms of aluminum oxide may be used, such as Activated Alumina, bauxite, alumina hydrates, alumina gels, and peptized alumina gels. Catalysts comprising Activated Alumina or peptized alumina gels containing from 1 to 20% by weight of either molybdenum oxide or chromium oxide are very suitable for catalytic reforming in the presence of hydrogen.

After a period of 2 to 24 hours or more, it is found that the catalyst requires regeneration. Regeneration is effected by shutting off the flow of oil and hydrogen and passing hot, inert gases containing regulated small quantities of air or oxygen through the catalyst mass until substantially all of the carbonaceous contaminants have been burned off. The regeneration treatment, being a combustion, is exothermic and large quantities of heat are evolved. In order to prevent excessively high temperatures from being developed in any portion of the catalyst, the temperature must be carefully controlled. Temperatures in excess of 1200° F. frequently cause permanent loss of catalyst activity. As pointed out above, the control of burning and temperature in the catalyst mass during regeneration is greatly simplified if the carbonaceous contaminants are distributed more or less uniformly throughout the catalyst mass instead of being concentrated in one portion thereof. Operation of the reforming process in accordance with the present invention makes possible this uniform distribution of carbonaceous contaminants. Following the regeneration treatment the flow of oil and hydrogen through the catalyst may be resumed.

In the operation of the process, the location of the intermediate point or points in the two reaction chambers at which the naphthenic feed is introduced will be determined very largely by the relative paraffinicity and naphthenicity of the respective feed stocks. Thus, for example, if the two feed stocks are highly paraffinic and highly naphthenic respectively, the naphthenic feed will be introduced at a somewhat lower intermediate point than if the feed stocks are less paraffinic and less naphthenic respectively. In some cases the naphthenic feed may be introduced only into the second chamber. It may even be possible in some cases where the preliminary segregation between paraffins and naphthenes is sharp to dispense with the second reaction chamber because the reheating step may not be necessary. It is also within the scope of the invention to segregate a hydrocarbon oil into a plurality of fractions and inject each fraction into the reaction chambers at that point which is determined to be best from the ratio of paraffins to naphthenes in said fraction. It will be understood that naphthenic feed stock may be injected into any number of reaction chambers operating in series or parallel.

This invention is not limited by any theories of the mechanism of the reactions involved nor by any details which have been given merely for purposes of illustration but is limited only in and by the following claims in which it is intended to claim all novelty inherent in the invention.

I claim:

1. In a process of catalytic reforming in which heated oil vapors are introduced into one end of a reaction chamber containing a catalyst and reaction products are withdrawn from the opposite end thereof and the bulk of the heat of reaction is supplied as preheat to the fluid feed, the improvements which comprise supplying heated vapors of a highly paraffinic oil to one end of the reaction chamber and supplying heated vapors of a highly naphthenic hydrocarbon oil to an intermediate portion of the reaction chamber.

2. In a process of catalytic reforming in the presence of hydrogen in which heated vapors of hydrocarbon oil and hydrogen are introduced into one end of a reaction chamber containing a catalyst and reaction products are withdrawn from the opposite end thereof and the bulk of the heat of reaction is supplied as preheat to the fluid feed, the improvements which comprise supplying hydrogen and heated vapors of a highly paraffinic oil to one end of the reaction chamber and supplying heated vapors of a highly naphthenic oil to an intermediate portion of the reaction chamber.

3. In a process of catalytic reforming in which heated oil vapors are introduced into one end of a reaction chamber containing a catalyst and reaction products are withdrawn from the opposite end thereof and the bulk of the heat of reaction is supplied as preheat to the fluid feed, the improvements which comprise introducing the relatively more paraffinic constituents of the hydrocarbon oil into one end of the reaction chamber and introducing the relatively more naphthenic constituents of the oil into an intermediate portion of the reaction chamber.

4. In a process of catalytic reforming in the presence of hydrogen in which the heated oil vapors and hydrogen are introduced into one end of a reaction chamber containing a catalyst and reaction products are withdrawn from the opposite end thereof and the bulk of the heat of reaction is supplied as preheat to the fluid feed, the improvements which comprise introducing hydrogen and the relatively more paraffinic constituents of the hydrocarbon oil into one end of the reaction chamber and introducing the relatively more naphthenic constituents of the hydrocarbon oil into an intermediate position of the reaction chamber.

5. An improved process of catalytically reforming a hydrocarbon oil which originally consisted essentially of hydrocarbons boiling in the gasoline range and containing both paraffinic and naphthenic constituents and has been separated into its respectively more paraffinic and naphthenic fractions, which comprises heating both fractions to a temperature suitable for reforming to thereby supply the heat of reaction as preheat, introducing the heated more paraffinic fraction into one end of a reaction chamber containing a reforming catalyst, introducing the more naphthenic fraction into an intermediate portion of the reaction chamber, removing products of reaction from the end of the reaction chamber opposite from that into which the paraffinic fraction is introduced, and recovering from the products of reaction a reformed product.

6. An improved process of catalytically reforming in the presence of hydrogen a hydrocarbon oil which originally consisted essentially of hydrocarbons boiling in the gasoline range and containing both paraffinic and naphthenic constituents and has been separated into its respectively more paraffinic and naphthenic fractions, which comprises heating both fractions to a temperature suitable for reforming to thereby supply the heat of reaction as preheat, introducing hydrogen and the heated paraffinic fraction into one end of a reaction chamber containing a reforming catalyst, introducing the heated naphthenic fraction into an intermediate portion of the reaction chamber, removing products of reaction from that end of the reaction chamber which is opposite to the end into which the paraffinic fraction is introduced, separating the normally gaseous products of reaction from the normally liquid products, and recycling the normally gaseous products to the reaction chamber to provide the hydrogen required therein.

7. In a process of catalytic reforming in which the heated hydrocarbon oil to be treated is passed through a first reaction chamber, is then reheated and passed through a second reaction chamber and the bulk of the heat of reaction in each reaction chamber is supplied as preheat to the fluid feed, the improvements which comprise introducing the more paraffinic fraction of the hydrocarbon oil into the inlet end of the first reaction chamber and introducing the more naphthenic fractions of the hydrocarbon oil into both reaction chambers at points intermediate between the points of inlet thereto and outlet therefrom.

8. In a process of catalytic reforming in which the heated hydrocarbon oil to be treated is passed through a first reaction chamber, is then reheated and passed through a second reaction chamber and the bulk of the heat of reaction in each reaction chamber is supplied as preheat to the fluid feed, the improvements which comprise introducing the more paraffinic fraction of the hydrocarbon oil into the first reaction chamber and introducing the more napththenic fractions of the hydrocarbon oil into the second reaction chamber.

9. Process according to claim 7 in which the catalytic reforming is conducted in the presence of hydrogen.

10. Process according to claim 8 in which the catalytic reforming is conducted in the presence of hydrogen.

11. In a process of catalytic reforming in which heated oil vapors are introduced into one end of a reaction chamber containing a catalyst and reaction products are withdrawn from the opposite end thereof and the bulk of the heat of reaction is supplied as preheat to the fluid feed, the improvement which comprises supplying vapors of two separate oils to the reaction chamber at different points thereof, the vapors of the relatively more paraffinic oil being supplied to the inlet end of said reaction chamber and the vapors of the relatively more naphthenic oil being supplied to the reaction chamber at a point intermediate its inlet and outlet ends.

MAURICE W. MAYER.